Figure 5:
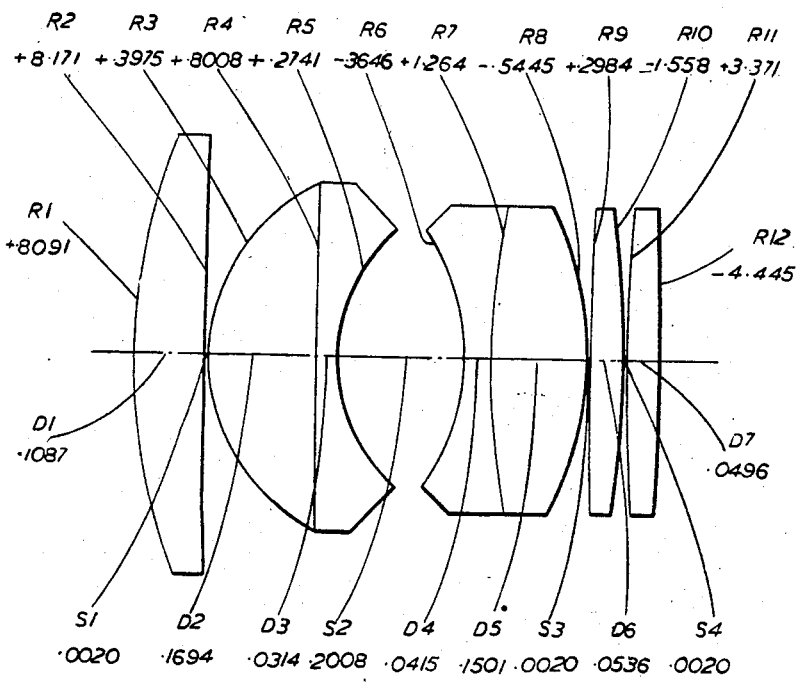

April 16, 1946.  A. WARMISHAM  2,398,680
OPTICAL OBJECTIVE
Filed Sept. 21, 1944     3 Sheets-Sheet 1
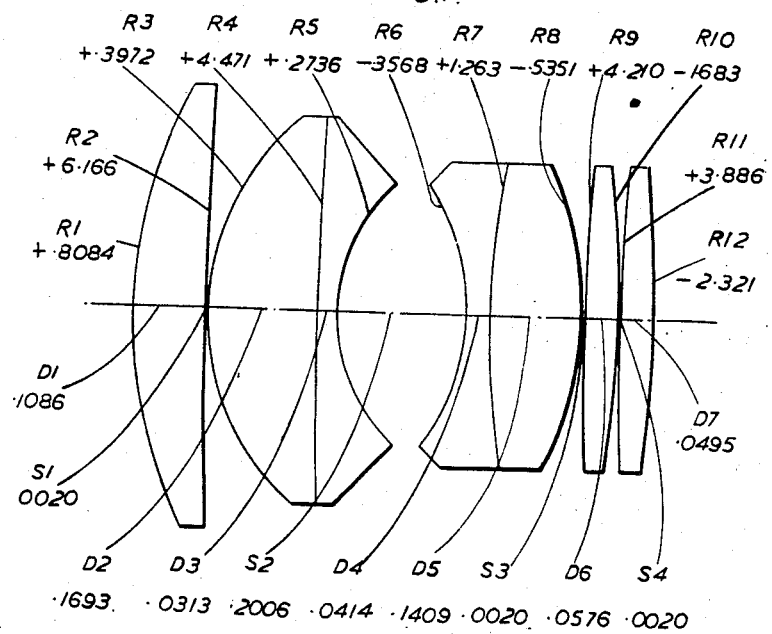
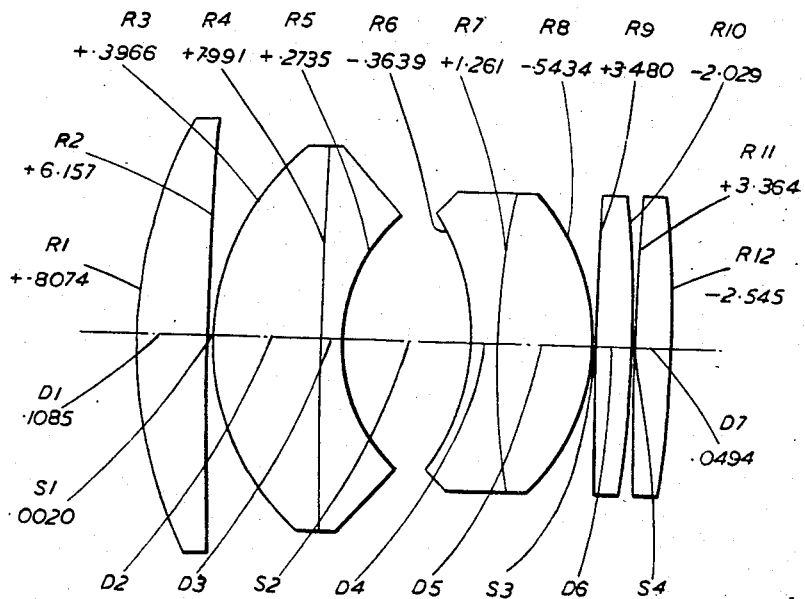

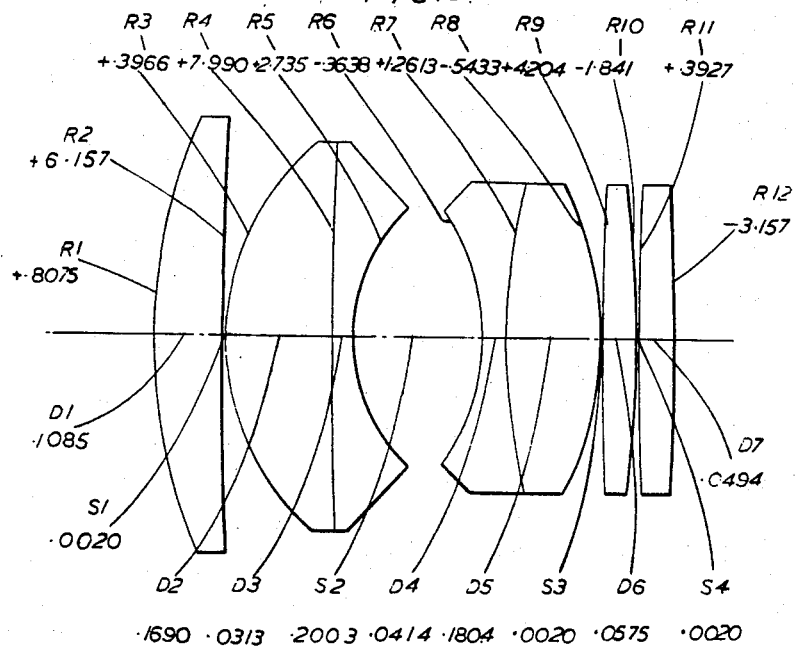
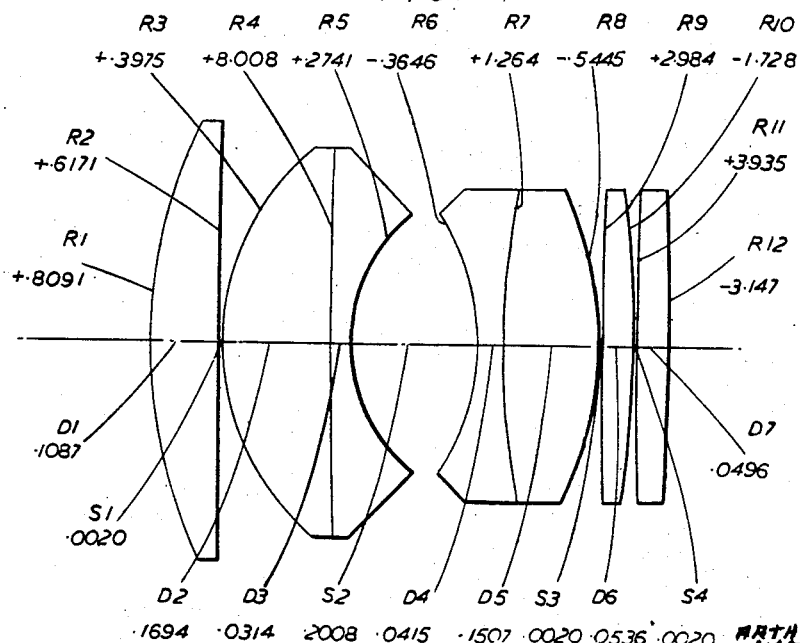

Patented Apr. 16, 1946

2,398,680

UNITED STATES PATENT OFFICE 2,398,680

OPTICAL OBJECTIVE

Arthur Warmisham, Leicester, England, assignor to Taylor, Taylor & Hobson Limited, Leicester, England, a company of Great Britain Application September 21, 1944, Serial No. 555,167
In Great Britain July 6, 1943

17 Claims. (Cl. 88—57)

This invention relates to optical objectives for photographic or projection or like purposes, of the kind corrected for spherical and chromatic aberrations, coma, astigmatism, field curvature and distortion and comprising two compound dispersive meniscus components having their concave air-exposed surfaces facing one another disposed between a front collective component and a pair of rear collective components. It is to be understood the term "front" as herein used refers to the side of the objective nearer to the longer conjugate and the term "rear" to the side nearer the shorter conjugate.

It is known in such an objective, in order to improve the corrections for spherical aberration and field curvature, to employ glasses having mean refractive index greater than 1.63 for the front element of the front compound dispersive component, for the rear element of the rear compound dispersive component and for the front member of the pair of collective rear components, the three collective components all consisting of simple elements. In such known objective the two rear collective components both have their shallower surfaces facing the front and the optical power of the rear component lies between 40% and 70% of the equivalent power of the whole objective.

The present invention has for its object still further to improve the correction of the abberations in an objective of the above mentioned kind.

In the objective according to the invention the mean refractive index of the material used for the rear element of the rear dispersive component lies between 1.70 and 1.80, whilst the collective fourth component is simple and is made of a material having mean refractive index less than 1.70, at least one of the two collective rear components having its shallower surface facing the front.

The power (that is the reciprocal of the focal length) of the collective rear component preferably lies between 30% and 70% of the power of the whole objective. Conveniently the sum of the numerical values of the radii of curvature of the concave air-exposed surfaces of the two compound dispersive components is greater than .5 and less than .7 times the equivalent focal length of the whole objective. The three collective components are preferably all in the form of simple elements.

Usually, both rear collective components will have their shallower surfaces facing the front, and in such case the radii of curvature of the rear surfaces of these components lie between 1.5 and 4.0 times the equivalent focal length of the whole objective. This, however, is not essential to the invention, and one of these components, for example the rear component, may have its shallower surface facing the rear. In such case the radii of curvature of the rear surfaces of the two components preferably lie between 1.3 and 6.0 times the equivalent focal length of the whole objective.

The rear element of the rear dispersive component may be made of optical glass having the appropriate refractive index or alternatively it is sometimes convenient to use crystalline magnesium oxide in the form known as β-magnesium-oxide for this element. Such crystal may also be used for the collective rear component.

Figures 1–5 of the accompanying drawings respectively illustrate five practical examples of objective according to the invention, and numerical data for these examples are given respectively in the following tables, in which $R_1$ $R_2$ ... represent the radii of curvature of the various surfaces counting from the front (the positive sign indicating that the surface is convex to the front and the negative sign that it is concave thereto), $D_1$ $D_2$ ... represent the axial thicknesses of the individual elements, and $S_1$ $S_2$ ... represent the axial air separations between the components. The tables also give the mean refractive indices $n_D$ for the D-line and the Abbé V numbers of the materials used for the elements.

Example I

Equivalent focal length 1.000. Relative aperture F/1.5

| Radius | Thickness or air separation | Refractive index $n_D$ | Abbé V number |
|---|---|---|---|
| $R_1$+ .8084 | $D_1$ .1086 | 1.6135 | 59.3 |
| $R_2$+6.166 | $S_1$ .0020 | | |
| $R_3$+ .3972 | $D_2$ .1693 | 1.6431 | 48.3 |
| $R_4$+4.471 | $D_3$ .0313 | 1.67605 | 32.3 |
| $R_5$+ .2736 | $S_2$ .2006 | | |
| $R_6$— .3568 | $D_4$ .0414 | 1.621 | 36.2 |
| $R_7$+1.263 | $D_5$ .1409 | 1.7445 | 45.8 |
| $R_8$— .5351 | $S_3$ .0020 | | |
| $R_9$+4.210 | $D_6$ .0576 | 1.613 | 59.3 |
| $R_{10}$—1.683 | $S_4$ .0020 | | |
| $R_{11}$+3.886 | $D_7$ .0495 | 1.6135 | 59.3 |
| $R_{12}$—2.321 | | | |

Example II

Equivalent focal length 1.000. Relative aperture F/1.5

| Radius | Thickness or air separation | Refractive index $n_D$ | Abbé V number |
|---|---|---|---|
| $R_1+ .8074$ | | | |
| | $D_1$ .1085 | 1.6135 | 53.5 |
| $R_2+6.157$ | | | |
| | $S_1$ .0020 | | |
| $R_3+ .3966$ | | | |
| | $D_2$ .1691 | 1.6431 | 48.3 |
| $R_4+7.991$ | | | |
| | $D_3$ .0313 | 1.67605 | 32.3 |
| $R_5+ .2735$ | | | |
| | $S_2$ .2003 | | |
| $R_6- .3639$ | | | |
| | $D_4$ .0414 | 1.608 | 38.2 |
| $R_7+1.261$ | | | |
| | $D_5$ .1504 | 1.7385 | 53.5 |
| $R_8- .5434$ | | | |
| | $S_3$ .0020 | | |
| $R_9+3.480$ | | | |
| | $D_6$ .0575 | 1.613 | 53.5 |
| $R_{10}-2.029$ | | | |
| | $S_4$ .0020 | | |
| $R_{11}+3.364$ | | | |
| | $D_7$ .0494 | 1.6135 | 59.3 |
| $R_{12}-2.545$ | | | |

Example III

Equivalent focal length 1.000. Relative aperture F/1.5

| Radius | Thickness or air separation | Refractive index $n_D$ | Abbé V number |
|---|---|---|---|
| $R_1+ .8073$ | | | |
| | $D_1$ .1085 | 1.6135 | 53.5 |
| $R_2+6.157$ | | | |
| | $S_1$ .0020 | | |
| $R_3+ .3966$ | | | |
| | $D_2$ .1690 | 1.6431 | 48.3 |
| $R_4+7.990$ | | | |
| | $D_3$ .0313 | 1.67605 | 32.3 |
| $R_5+ .2735$ | | | |
| | $S_2$ .2003 | | |
| $R_6- .3638$ | | | |
| | $D_4$ .0414 | 1.608 | 38.2 |
| $R_7+1.2613$ | | | |
| | $D_5$ .1504 | 1.7385 | 53.5 |
| $R_8- .5433$ | | | |
| | $S_3$ .0020 | | |
| $R_9+4.204$ | | | |
| | $D_6$ .0575 | 1.613 | 53.5 |
| $R_{10}-1.841$ | | | |
| | $S_4$ .0020 | | |
| $R_{11}+3.927$ | | | |
| | $D_7$ .0494 | 1.7385 | 53.5 |
| $R_{12}-3.157$ | | | |

Example IV

Equivalent focal length 1.000. Relative aperture F/1.5

| Radius | Thickness or air separation | Refractive index $n_D$ | Abbé V number |
|---|---|---|---|
| $R_1+ .8091$ | | | |
| | $D_1$ .1087 | 1.6135 | 53.5 |
| $R_2+6.171$ | | | |
| | $S_1$ .0020 | | |
| $R_3+ .3975$ | | | |
| | $D_2$ .1694 | 1.6431 | 48.3 |
| $R_4+8.008$ | | | |
| | $D_3$ .0314 | 1.67605 | 32.3 |
| $R_5+ .2741$ | | | |
| | $S_2$ .2008 | | |
| $R_6- .3646$ | | | |
| | $D_4$ .0415 | 1.608 | 38.2 |
| $R_7+1.264$ | | | |
| | $D_5$ .1507 | 1.7385 | 53.5 |
| $R_8- .5445$ | | | |
| | $S_3$ .0020 | | |
| $R_9+2.984$ | | | |
| | $D_6$ .0536 | 1.525 | 59.0 |
| $R_{10}-1.728$ | | | |
| | $S_4$ .0020 | | |
| $R_{11}+3.935$ | | | |
| | $D_7$ .0496 | 1.7385 | 53.5 |
| $R_{12}-3.147$ | | | |

Example V

Equivalent focal length 1.000. Relative aperture F/1.5

| Radius | Thickness or air separation | Refractive index $n_D$ | Abbé V number |
|---|---|---|---|
| $R_1+ .8091$ | | | |
| | $D_1$ .1087 | 1.6135 | 53.5 |
| $R_2+6.171$ | | | |
| | $S_1$ .0020 | | |
| $R_3+ .3975$ | | | |
| | $D_2$ .1694 | 1.6431 | 48.3 |
| $R_4+8.008$ | | | |
| | $D_3$ .0314 | 1.67605 | 32.3 |
| $R_5+ .2741$ | | | |
| | $S_2$ .2008 | | |
| $R_6- .3646$ | | | |
| | $D_4$ .0415 | 1.608 | 38.2 |
| $R_7+1.264$ | | | |
| | $D_5$ .1507 | 1.7385 | 53.5 |
| $R_8- .5445$ | | | |
| | $S_3$ .0020 | | |
| $R_9+2.984$ | | | |
| | $D_6$ .0536 | 1.525 | 59.0 |
| $R_{10}-1.555$ | | | |
| | $S_4$ .0020 | | |
| $R_{11}+3.371$ | | | |
| | $D_7$ .0496 | 1.7385 | 53.5 |
| $R_{12}-4.445$ | | | |

The back focal lengths in these five examples are respectively .5731, .5692, .5717, .5714 and .5705 times the equivalent focal length of the objective. The ratio of the power of the rear component to that of the whole objective is 42.3% in Example I, 42.3% in Example II, 42.2% in Example III, 42.2% in Example IV and 38.5% in Example V. The numerical sum of $R_5$ and $R_6$ lies between .63 and .64 in all five examples. In the first four examples the two rear collective components have their shallower surfaces facing the front, whilst in Example V the rear component has its shallower surface facing the rear.

In Example I the rear element of the rear dispersive component is made of optical glass, whilst in the other four examples magnesium oxide crystal is used for this element. This crystal is also used for the rear component in Examples III, IV and V, this component being made of dense barium crown glass in Examples I and II. Examples IV and V (which are substantially the same except for the curvatures of the last three surfaces) differ from the first three examples primarily in the use of a low index glass for the collective fourth component.

What I claim as my invention and desire to secure by Letters Patent is:

1. An optical objective, corrected for spherical and chromatic aberrations, coma, astigmatism, field curvature and distortion and comprising a collective front component, two compound dispersive meniscus components disposed behind such component, the concave air-exposed surfaces of such dispersive components facing one another and having radii of curvature whose numerical sum lies between .5 and .7 times the equivalent focal length of the whole objective, a simple collective fourth component made of a material having mean refractive index less than 1.70, and a collective fifth component, whose optical power lies between 30% and 70% of the power of the whole objective, at least one of the rear pair of collective components having its shallower surface facing the front, the mean refractive index of the material used for the rear element of the rear compound dispersive component lying between 1.70 and 1.80.

2. An optical objective as claimed in claim 1, in which the collective fourth component has its shallower surface facing the front, and the collective fifth component is in the form of a simple element.

3. An optical objective as claimed in claim 1, in which the collective fourth and fifth components each have their shallower surfaces facing the front.

4. An optical objective, corrected for spherical and chromatic aberrations, coma, astigmatism, field curvature and distortion and comprising a collective front component, two compound dispersive meniscus components disposed behind such component and having their concave air-exposed surfaces facing one another, a simple collective fourth component made of a material having mean refractive index less than 1.70, and a simple collective fifth component whose optical power lies between 30% and 70% of the power of the whole objective, the rear surface of each of the rear pair of collective components being more strongly curved than the front surface thereof and having radius of curvature between 1.5 and 4.0 times the equivalent focal length of the whole objective, the mean refractive index of the material used for the rear element of the rear compound dispersive component lying between 1.70 and 1.80.

5. An optical objective, corrected for spherical and chromatic aberrations, coma, astigmatism, field curvature and distortion and comprising a collective front component, two compound dispersive meniscus components disposed behind such component, the concave air-exposed surfaces of such dispersive components facing one another and having radii of curvature whose numerical sum lies between .5 and .7 times the equivalent focal length of the whole objective, a simple collective fourth component made of a material having mean refractive index less than 1.70, and a collective fifth component, the rear surface of each of the rear pair of collective components being more strongly curved than the front surface thereof and having radius of curvature between 1.5 and 4.0 times the equivalent focal length of the whole objective, the mean refractive index of the material used for the rear element of the rear compound dispersive component lying between 1.70 and 1.80.

6. An optical objective as claimed in claim 1, in which the collective fourth component has its shallower surface facing the front and the collective fifth component has its shallower surface facing the rear.

7. An optical objective, corrected for spherical and chromatic aberrations, coma, astigmatism, field curvature and distortion and comprising a collective front component, two compound dispersive meniscus components disposed behind such component and having their concave air-exposed surfaces facing one another, a simple collective fourth component having its shallower surface facing the front and made of a material having mean refractive index less than 1.70, and a collective fifth component having its shallower surface facing the rear and having optical power lying between 30% and 70% of the power of the whole objective, the radii of curvature of the rear surfaces of the two rear collective components lying between 1.3 and 6.0 times the equivalent focal length of the whole objective, the mean refractive index of the material used for the rear element of the rear compound dispersive component lying between 1.70 and 1.80.

8. An optical objective, corrected for spherical and chromatic aberrations, coma, astigmatism, field curvature and distortion and comprising a collective front component, two compound dispersive meniscus components disposed behind such component, the concave air-exposed surfaces of such dispersive components facing one another and having radii of curvature whose numerical sum lies between .5 and .7 times the equivalent focal length of the whole objective, a simple collective fourth component made of a material having mean refractive index less than 1.70 and having its shallower surface facing the front, and a simple collective fifth component having its shallower surface facing the rear, the radii of curvature of the rear surfaces of the two rear collective components each lying between 1.3 and 6.0 times the equivalent focal length of the whole objective, the mean refractive index of the material used for the rear element of the rear compound dispersive component lying between 1.70 and 1.80.

9. An optical objective as claimed in claim 1, in which the collective rear component consists of a simple element and is made of material having mean refractive index between 1.70 and 1.80.

10. An optical objective as claimed in claim 1, in which the rear element of the rear compound dispersive component is made of crystalline magnesium oxide in the form known as $\beta$-magnesium oxide.

11. An optical objective as claimed in claim 5, in which the rear element of the rear compound dispersive component is made of crystalline magnesium oxide in the form known as $\beta$-magnesium oxide.

12. An optical objective as claimed in claim 8, in which the rear element of the rear compound dispersive component is made of crystalline magnesium oxide in the form known as $\beta$-magnesium oxide.

13. An optical objective as claimed in claim 4, in which the rear element of the rear compound dispersive component and the simple collective rear component are both made of crystalline magnesium oxide in the form known as $\beta$-magnesium oxide.

14. An optical objective as claimed in claim 7, in which the rear element of the rear compound dispersive component and the simple collective rear component are both made of crystalline magnesium oxide in the form known as $\beta$-magnesium oxide.

15. An optical objective having numerical data substantially in accordance with the following table:

Equivalent focal length 1.000. Relative aperture F/1.5

| Radius | Thickness or air separation | Refractive index $n_D$ | Abbé V number |
|---|---|---|---|
| $R_1 + .8084$ | | | |
| | $D_1$ .1086 | 1.6135 | 59.3 |
| $R_2 + 6.166$ | | | |
| | $S_1$ .0020 | | |
| $R_3 + .3972$ | | | |
| | $D_2$ .1693 | 1.6431 | 48.3 |
| $R_4 + 4.471$ | | | |
| | $D_3$ .0313 | 1.67605 | 32.3 |
| $R_5 + .2736$ | | | |
| | $S_2$ .2006 | | |
| $R_6 - .3568$ | | | |
| | $D_4$ .0414 | 1.621 | 36.2 |
| $R_7 + 1.263$ | | | |
| | $D_5$ .1409 | 1.7445 | 45.8 |
| $R_8 - .5351$ | | | |
| | $S_3$ .0020 | | |
| $R_9 + 4.210$ | | | |
| | $D_6$ .0576 | 1.613 | 59.3 |
| $R_{10} - 1.683$ | | | |
| | $S_4$ .0020 | | |
| $R_{11} + 3.886$ | | | |
| | $D_7$ .0495 | 1.6135 | 59.3 |
| $R_{12} - 2.321$ | | | | wherein the terms R, D, and S represent the radii of curvature of the various surfaces counting from the front (the positive sign indicating that the surface is convex to the front and the negative sign that it is concave thereto), $D_1D_2 \ldots$ represent the axial thicknesses of the individual elements, and $S_1S_2 \ldots$ represent the axial air separations between the components; the tables also give the means refractive indices $n_D$ for the D-line and the Abbé V numbers of the materials used for the elements.

16. An optical objective having numerical data substantially in accordance with the following table:

Equivalent focal length 1.000. Relative aperture F/1.5

| Radius | Thickness or air separation | | Refractive index $n_D$ | Abbé V number |
|---|---|---|---|---|
| $R_1+ .8073$ | | | | |
| | $D_1$ | .1085 | 1.6135 | 53.5 |
| $R_2+6.157$ | | | | |
| | $S_1$ | .0020 | | |
| $R_3+ .3966$ | | | | |
| | $D_2$ | .1690 | 1.6431 | 48.3 |
| $R_4+7.990$ | | | | |
| | $D_3$ | .0313 | 1.67605 | 32.3 |
| $R_5+ .2735$ | | | | |
| | $S_2$ | .2003 | | |
| $R_6- .3638$ | | | | |
| | $D_4$ | .0414 | 1.608 | 38.2 |
| $R_7+1.2613$ | | | | |
| | $D_5$ | .1504 | 1.7385 | 53.5 |
| $R_8- .5433$ | | | | |
| | $S_3$ | .0020 | | |
| $R_9+4.204$ | | | | |
| | $D_6$ | .0575 | 1.613 | 53.5 |
| $R_{10}-1.841$ | | | | |
| | $S_4$ | .0020 | | |
| $R_{11}+3.927$ | | | | |
| | $D_7$ | .0494 | 1.7385 | 53.5 |
| $R_{12}-3.157$ | | | | | wherein the terms R, D, and S represent the radii of curvature of the various surfaces counting from the front (the positive sign indicating that the surface is convex to the front and the negative sign that it is concave thereto), $D_1D_2 \ldots$ represent the axial thicknesses of the individual elements, and $S_1S_2 \ldots$ represent the axial air separations between the components; the tables also give the means refractive indices $n_D$ for the D-line and the Abbé V numbers of the materials used for the elements.

17. An optical objective having numerical data substantially in accordance with the following table:

Equivalent focal length 1.000. Relative aperture F/1.5

| Radius | Thickness or air separation | | Refractive index $n_D$ | Abbé V number |
|---|---|---|---|---|
| $R_1+ .8091$ | | | | |
| | $D_1$ | .1087 | 1.6135 | 53.5 |
| $R_2+6.171$ | | | | |
| | $S_1$ | .0020 | | |
| $R_3+ .3975$ | | | | |
| | $D_2$ | .1694 | 1.6431 | 48.3 |
| $R_4+8.008$ | | | | |
| | $D_3$ | .0314 | 1.67605 | 32.3 |
| $R_5+ .2741$ | | | | |
| | $S_2$ | .2008 | | |
| $R_6- .3646$ | | | | |
| | $D_4$ | .0415 | 1.608 | 38.2 |
| $R_7+1.264$ | | | | |
| | $D_5$ | .1507 | 1.7385 | 53.5 |
| $R_8- .5445$ | | | | |
| | $S_3$ | .0020 | | |
| $R_9+2.984$ | | | | |
| | $D_6$ | .0536 | 1.525 | 59.0 |
| $R_{10}-1.555$ | | | | |
| | $S_4$ | .0020 | | |
| $R_{11}+3.371$ | | | | |
| | $D_7$ | .0496 | 1.7385 | 53.5 |
| $R_{12}-4.445$ | | | | | wherein the terms R, D, and S represent the radii of curvature of the various surfaces counting from the front (the positive sign indicating that the surface is convex to the front and the negative sign that it is concave thereto), $D_1D_2 \ldots$ represent the axial thicknesses of the individual elements, and $S_1S_2 \ldots$ represent the axial air separations between the components; the tables also give the means refractive indices $n_D$ for the D-line and the Abbé V numbers of the materials used for the elements.

ARTHUR WARMISHAM.